United States Patent [19]

Krosunger

[11] 4,334,356
[45] Jun. 15, 1982

[54] ANTI-MAR BASE FOR SABER- AND BAYONET-TYPE SAWS AND THE LIKE

[76] Inventor: Peter Krosunger, 19 Clinton St., Port Jefferson, N.Y. 11776

[21] Appl. No.: 168,868

[22] Filed: Jul. 14, 1980

[51] Int. Cl.$^3$ ............................................. B27B 11/00
[52] U.S. Cl. ..................................... 30/374; 30/273
[58] Field of Search ................ 30/392, 374, 375, 376, 30/371, 377, 273

[56] References Cited

U.S. PATENT DOCUMENTS

| | | | |
|---|---|---|---|
| 1,955,350 | 4/1934 | Sweet | 30/273 |
| 3,045,725 | 7/1962 | McCarty | 30/374 |
| 3,303,861 | 2/1967 | Kane | 30/374 |
| 4,213,242 | 7/1980 | Partington | 30/374 |
| 4,233,738 | 11/1980 | Dedrick | 30/374 |

*Primary Examiner*—Jimmy C. Peters

*Attorney, Agent, or Firm*—Posnack, Roberts, Cohen & Spiecens

[57] ABSTRACT

An anti-mar base is provided for a saber- or bayonet-type saw. The anti-mar base is provided with spring clips to detachably affix the same to the corresponding base of the saw in order to prevent the marring of objects to be cut. The anti-mar base is made of a smooth material in the form of a sled-like member having two runners separated by a groove into which a key-like opening opens. The key-like opening is formed of a circular opening to which is connected a slot. The spring clips extend from two metal strips which traverse the sled-like member extending through the body thereof and exposed in the aforementioned groove. The spring clips are of S-shape and permit the ready removal of the anti-mar base from the saw base.

6 Claims, 4 Drawing Figures

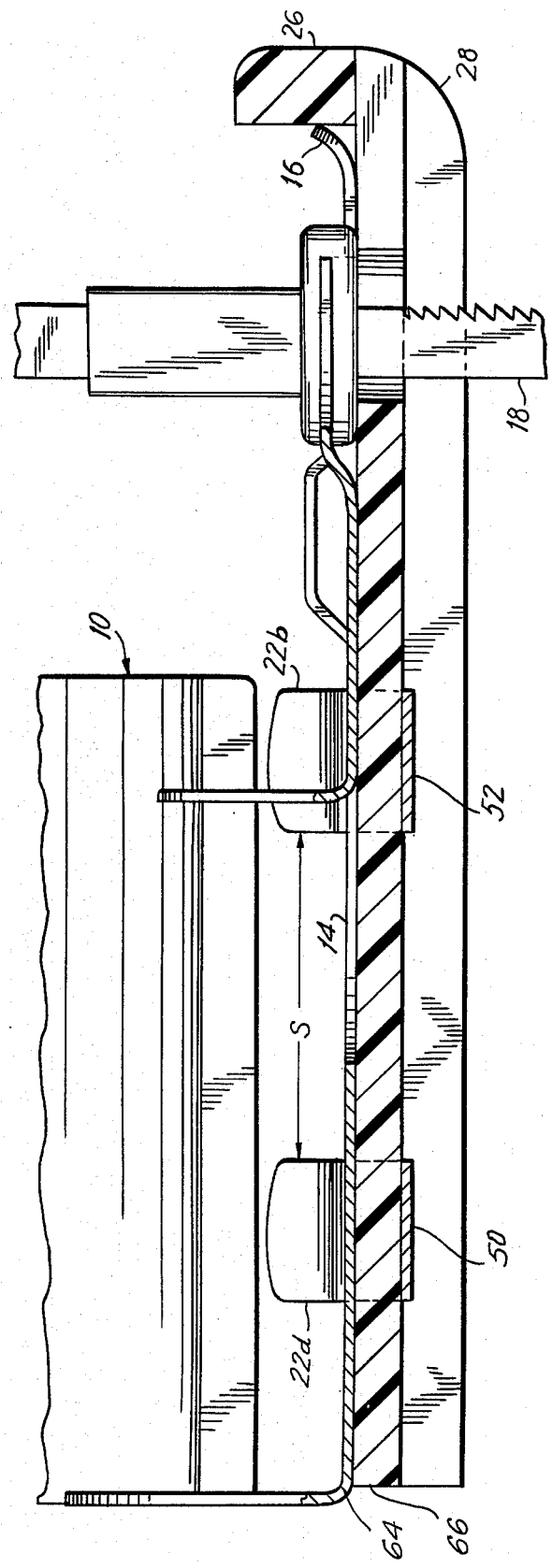
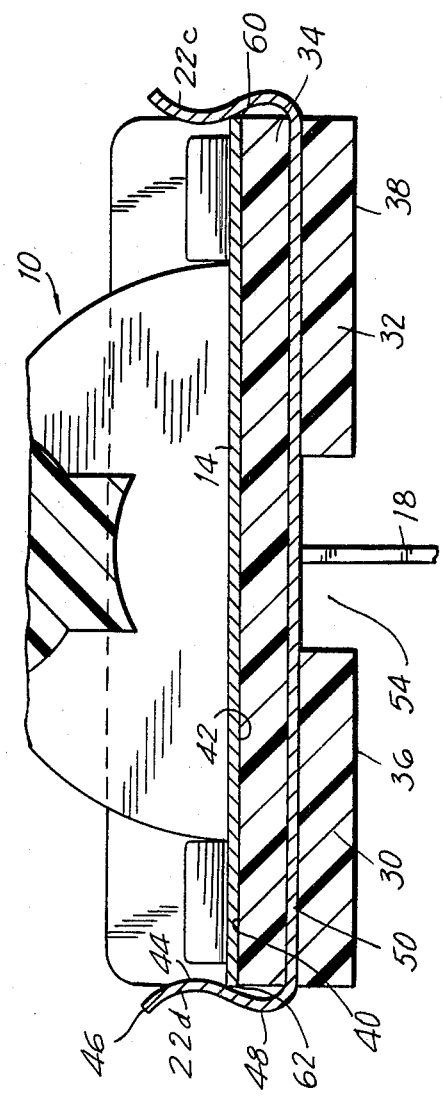

ANTI-MAR BASE FOR SABER- AND BAYONET-TYPE SAWS AND THE LIKE

FIELD OF INVENTION

This invention relates to anti-mar bases for saber- and bayonet-type saws and the like and more particularly to detachable protective elements to prevent damage to objects which are to be sawed due to marring by conventional saw bases.

BACKGROUND

In the sawing of fine paneling, formica-type laminates, and ceramic tile and the like by electric saber saws or bayonet saws, scratching and other types of marring and damage frequently occur due to the conventional metal base of this type of power tool. In fact, with the conventional base of this type of power tool, it has been found almost impossible to cut ceramic tile and paneling as well as formica laminates without disfiguring the surfaces thereof. As will be shown, the invention provides an anit-mar base with a relatively smooth surface and a rounded leading edge to avoid damage to the objects which are to be cut.

It has been found that numerous types of attachments have previously been provided for saw constructions. Thus, for example, saw attachments are found in U.S. Pat. Nos. 3,303,861 and 4,051,597.

In U.S. Pat. No. 3,303,861, R. A. Kane illustrates an element adapted to be detachably mounted upon the conventional base of a bayonet saw to engage the upper surface of the workpiece. The base element is such that, when it is mounted on a saw, the blade protrudes through an aperture in the base element so that the path of upward motion of the blade teeth is closely embraced by the element so as to fully support the workpiece material closely around the cutting area to prevent tearing or chipping of the top surface of the workpiece. The base element thus incorporates blade guide elements to prevent or minimize relative twisting or lateral motion between the blade and the base element to avoid undue wear on the detachable element.

In U.S. Pat. No. 4,051,587, Louis Cardoza provides a saw guide device which includes a planar element having a pair of sides, a forward end, and a rear end. A flange member is affixed at an obtuse angle to the foward end and an L-shaped member is affixed at each side of the planar element and is tilted inwardly over the planar element. The shoe of the saw is adapted to be received on the planar element and a block element is affixed to the bottom rear center of the planar element to be received into the saw cut rearwardly of the saw blade. This is intended to constitute a saw guide for producing a straight line cut with saber-type saws and the like.

SUMMARY OF INVENTION

It is an object of the invention to provide an improved attachment for saber- and bayonet-type saws and the like to facilitate sawing while preventing the marring and damaging of workpieces to be cut.

It is another object of the invention to provide a means for improving the operation and utilization of power saws of the portable and manually manipulable type.

It is a further object of the invention to provide an improved attachment for a power saw which is readily detached and stored when not required for operation.

It is still another object of the invention to provide an improved anti-mar attachment for saws wherein provision is made to prevent the accumulation of chips, sawdust and the like which might prevent the proper operation of the associated saw blade.

Still another object of the invention is to provide an improved attachment for a power saw which will permit the cutting of curves and the like without increasing possibilities of the binding of the associated saw blade.

In achieving the above and other of its objectives, there is provided in accordance with the invention an anti-mar base fabricated of a relatively smooth plastic or the like for use in combination with a saw including a rigid base or shoe which has a front, rear and two sides as well as a source of motive power mounted on the base and a blade coupled to the source of motive power and extending below the base. The anti-mar base of the invention is provided with means for detachably holding the same on the rigid base which, for example, is fabricated of a metal such as steel.

In a preferred embodiment of the invention, the rigid base of the saw has a generally flat lower surface along which the saw is propelled and the anti-mar base has a flat upper surface in contact with the lower surface of the rigid base. Moreover, the means detachably holding the anti-mar base on the rigid base preferably includes clips fabricated of a spring-like material and resiliently engaging the sides of the base.

In further accordance with a preferred embodiment of the invention, the plastic anti-mar base of the invention includes an upwardly turned toe section to brace against the front of the rigid base. When reference is made herein to a plastic anit-mar base, the term "plastic" is intended to include not only synthetic plastics such as the types to be mentioned hereinafter but also materials such as wood and the like which have sufficient rigidity to perform the functions of the apparatus of the invention and which are capable of possessing the requisite smoothness so as to prevent marring or damaging of workpieces to be operated upon.

In further accordance with the invention, the blade of the saw extends through the rigid base and the plastic anti-mar base of the invention is provided with an opening through which the blade passes. Moreover, the plastic anti-mar base is provided with a slot forming a key hole with the opening and extending forwardly of the opening.

In accordance with still another feature of the invention, the plastic anti-mar base is provided with a downwardly open longitudinally extending groove into which the aforesaid opening and slot open. According to still another feature of the invention, strips extend transversely through the plastic anti-mar base and support the aforesaid clips. These strips are in a preferred embodiment of the invention exposed in the aforementioned groove.

The circular opening referred to hereinabove has a diameter preferably substantially greater than the width of the aforesaid slot. The opening may be, for example, in the order of one half of an inch in diameter with the slot having a width of approximately one-quarter of an inch. The anti-mar base of the invention preferably has a thickness of approximately one-quarter to one-half of an inch.

The aforesaid clips may have the shape of an "s" and the anti-mar base of the invention may be preferably manufactured of plexiglas gaving a relatively smooth lower surface and provided with a rounded front edge.

In general, it may be observed that the preferred embodiment of the invention is in the form of a sled-like member including two runners separated by a groove and provided with a key-shaped opening through which the aforesaid blade passes.

The invention will be more clearly understood from the detailed description which follows hereinafter wherein other objects, features, and advantages of the invention will appear.

BRIEF DESCRIPTION OF DRAWING

Figure 1:
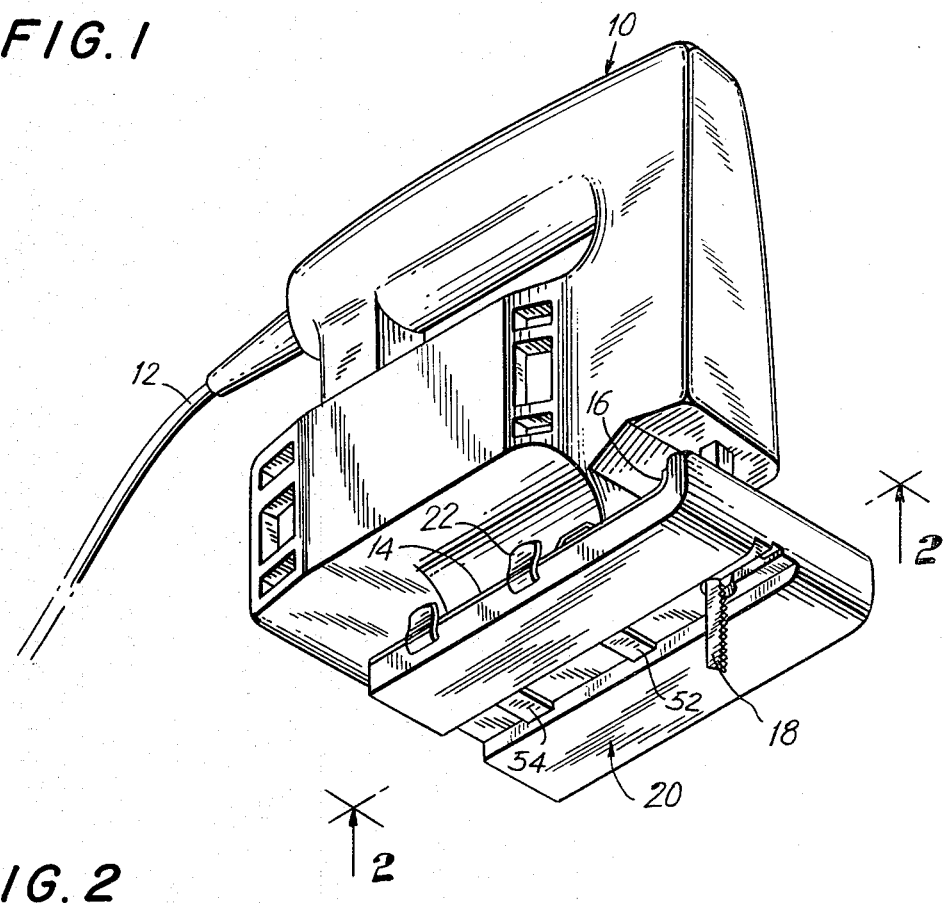
Figure 2:
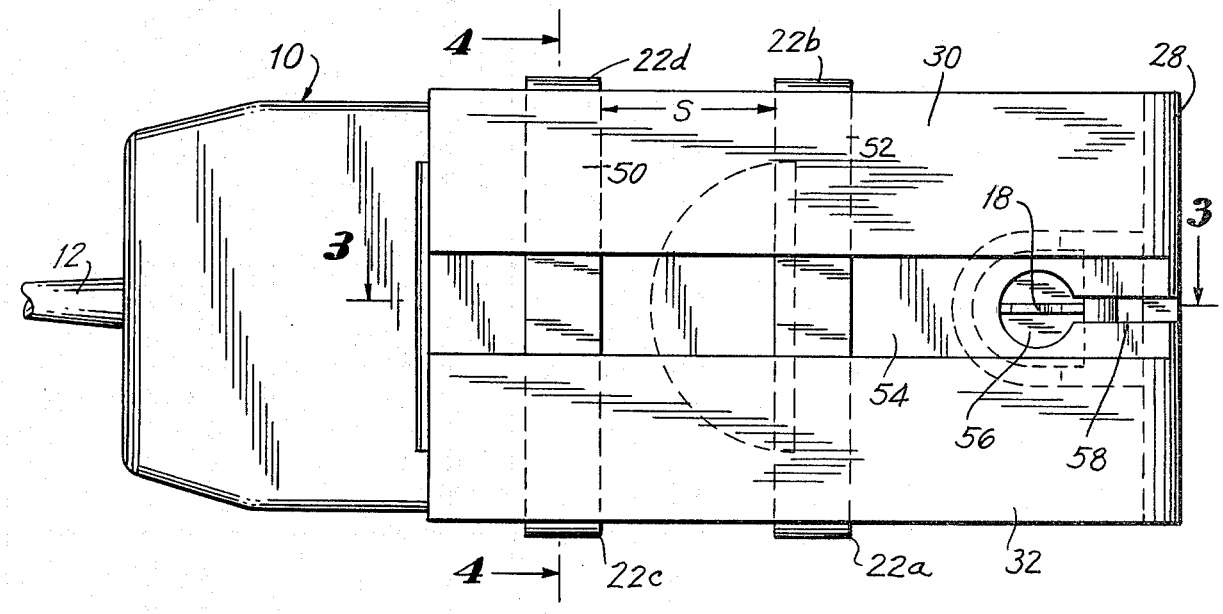

IN THE DRAWING:

FIG. 1 is a bottom perspective view of a saber-type saw to which has been attached an anti-mar base provided in accordance with the invention;

FIG. 2 is a bottom view of the saw and attached anti-mar base as illustrated in FIG. 1;

FIG. 3 is a sectional view taken along line 3—3 of FIG. 2; and

FIG. 4 is a sectional view taken along line 4—4 of FIG. 2.

DETAILED DESCRIPTION

As has been mentioned hereinabove, the invention provides an anti-mar base for detachable mounting on the base of a saber-type power saw or the like to prevent the marring, scratching and damaging of fine paneling, formica-type laminates and ceramic tile and the like as may otherwise be caused by the rigid metal bases or shoes employed in the above-mentioned type of tool.

In FIG. 1 is illustrated by way of illustration a saber-type saw 10 having an electric cord 12 for purposes of electrical power supply and further including a rigid metal base 14 of generally planar construction with a flat lower surface and an upturned leading toe 16. As will be readily understood, the rigid base 14 includes a leading edge or front, a rear, and two side edges. The saw illustrated in FIG. 1 furthermore includes a vertical downwardly extending blade 18 which is driven by a motor (not shown) in reciprocating operation in order to effect the cutting of a workpiece (not shown).

In accordance with the invention, there is provided a plastic anti-mar base 20 generally of sled-like configuration and having an upturned leading toe and a rounded leading edge as will be discussed in greater detail hereinafter. The anti-mar base of the invention is provided with spring clips such as indicated at 22 in order to effect a detachable coupling of the anti-mar base to the rigid base of the saw.

FIGS. 2–4 illustrate various of the details of the invention as next described more completely below. In these figures, the spring clips which were referred to generally under reference character 22 above will be identified more specifically as spring clips 22a, 22b, 22c, and 22d.

As has been mentioned hereinabove, the anti-mar base of the invention is fabricated of a plastic or equivalent material. Such plastic may, for example, be plexiglas or methyl methylacrylate. The attachment of the invention may also be fabricated, for example, of wood. Plexiglas is, however, the preferred material of the invention.

It has also been mentioned hereinabove that the anti-mar base of the invention has a generally sled-like configuration. To this end, it has an upwardly turned toe 26 at the leading edge of the anti-mar base, this toe engaging the upwardly turned front edge 16 of the rigid base of the saw to which the attachment of the invention is detachably affixed. The leading edge of the attachment is furthermore rounded such as indicated at 28, such rounded edge permitting the easy flow of the attachment and thereby the saw over the workpiece being cut.

The sled-like configuration of the invention is moreover provided with two runners 30 and 32 connected in depending relationship to the body 34 of the attachment in monolithic relationship therewith. The runners 30 and 32 have flat, smooth lower surfaces indicated at 36 and 38 to permit a riding over the workpiece without damaging, marring, scratching, or otherwise harming the same. The surfaces 36 and 38 are coplanar.

The body 34 of the attachment of the invention has a planar upper surface 40 which engages against the flat lower surface 42 of the base 14. These two bases therefore have a bearing surface which comprises the entire contacting area extent of the two members.

The aforesaid spring clips are provided in pairs which are spaced apart at a distance S which may be, for example, in a range of from ½ to 1½ inches. The spring clips are fabricated of, for example, a metal such as spring steel or beryllium copper. As will be seen more particularly in FIG. 4, the spring clips have generally the shape of an "s" having a middle portion such as indicated at 44 which bears on the corresponding upper side edge of the base 14. The flaring out of the associated upper portion 46 permits a ready attachment of the device of the invention on the base 14 whereas the sloping of the lower section 48 permits a ready detachment of the anti-mar base of the invention.

The spring clips are mounted on transverse strips 50 and 52 with which the spring clips are monolithic. As shown, for example, in FIG. 4, the spring clips are mounted on the aforesaid transverse strips 50 and 52 which extend through the anti-mar device, being exposed only in the groove between runners 30 and 32 and indicated more generally at 54. The runners 30 and 32 are parallel to one another and the strips 50 and 52 are perpendicularly oriented with respect thereto. The strips 50 and 52 are generally and preferably made of the same material as the spring clips 22a-d.

The anti-mar base of the invention is provided with a circular opening indicated at 56. The circular opening generally has a diameter in the order of ½ inch and is sufficient to accommodate the blade 18 which extends further into a slot 58 opening forwardly from the circular opening 56 in radial orientation therewith to form a keyhole. The slot 58, it will be noted, opens generally into the rounded section 28 at the front of the anti-mar base. This arrangement allows for the discharge of sawdust chips and the like, thereby preventing an accumulation of the waste products of the cutting operation and a possible binding or distortion of the blade 18 during operation. The opening 56 and the slot 58 extend through the body 34 of the attachment and open into the aforementioned groove 54. This arrangement moreover provides for relative ease in cutting curves since it will accommodate temporary disfigurations in the blade which tend to occur when the saw is being angularly displaced relative to an original direction thereof.

As will be understood from the aforegoing description, the spring clips engage the side edges of the rigid metal base of the saw, these side edges being indicated generally at 60 and 62. The front 16 of the saw base is engaged by the toe 26 of the attachment. The rear of the saw base is indicated at 64 and requires no engagement by the rear 66 of the attachment of the invention since the forward motion of the saw is adequate to hold the anti-mar base in position.

The thickness of the anti-mar base of the invention may preferably run from ¼ of an inch to ½ of an inch without this constituting any limitation on the scope of the invention. It has been mentioned above that the circular opening 56 may be generally in the order of ½ of an inch in diameter. The aforementioned slot may generally be in the order of ¼ of an inch in width, the slot and circular opening forming a key-shaped opening which allows the operation of the blade of the invention under the power drive from the associated source of motive power without interference by the accumulation of waste products or a change of direction of the sawing operation.

There will now be obvious to those skilled in the art many modifications and variations of the structure set forth hereinabove. These modifications and variations will not depart from the scope of the invention if defined by the following claims.

What is claimed is:

1. In combination with a saw including a rigid base having a front, rear and two sides, a source of motive power on said base, a blade coupled to said source of motive power and extending below said base, an anti-mar base, and means on said anti-mar base for detachably holding the same on said rigid base, said means including clips resiliently engaging the sides of the base, the anti-mar base including a generally planar section in face-to-face contact with the lower surface of the rigid base, the anti-mar base including an upwardly turned toe section to brace against the front of said rigid base, said blade extending through said rigid base and said anti-mar base being provided with an opening through which said blade passes, said anti-mar base being provided with a slot forming a keyhole with said opening and extending forwardly thereof, the anti-mar base being provided with a downwardly open longitudinally extending groove into which said opening and slot open, and strips extending transversely through said anti-mar base and supporting said clips, the strips being exposed in said groove.

2. A saw as claimed in claim 1 wherein the opening is circular and has a diameter substantially greater than the width of said slot.

3. A saw as claimed in claim 2 wherein said clips are S-shaped.

4. A saw as claimed in claim 2 wherein said anti-mar base is of plexiglas.

5. A saw as claimed in claim 2 wherein said anti-mar base has a relatively smooth lower surface.

6. A saw as claimed in claim 2 wherein said anti-mar base has a rounded front edge.

* * * * *